United States Patent
Jaradi et al.

(10) Patent No.: US 11,066,032 B2
(45) Date of Patent: Jul. 20, 2021

(54) DASH MOUNTED AIRBAG

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US); Anil Kalra, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/705,874

(22) Filed: Dec. 6, 2019

(65) Prior Publication Data

US 2021/0170977 A1 Jun. 10, 2021

(51) Int. Cl.
*B60R 21/205* (2011.01)
*B60R 21/239* (2006.01)

(52) U.S. Cl.
CPC .......... *B60R 21/205* (2013.01); *B60R 21/239* (2013.01); *B60R 2021/2395* (2013.01)

(58) Field of Classification Search
None
See application file for complete search history.

(56) References Cited

U.S. PATENT DOCUMENTS

| | | | |
|---|---|---|---|
| 3,929,350 A | 12/1975 | Pech | |
| 5,556,056 A | 9/1996 | Kalberer et al. | |
| 6,247,727 B1 * | 6/2001 | Hamada | B60R 21/2171 280/743.1 |
| 6,913,283 B2 | 7/2005 | Heym | |
| 7,731,232 B2 * | 6/2010 | Higuchi | B60R 21/2346 280/739 |
| 7,883,109 B2 * | 2/2011 | Parks | B60R 21/239 280/739 |
| 7,938,445 B2 * | 5/2011 | Smith | B60R 21/2338 280/743.2 |
| 9,434,343 B2 * | 9/2016 | Motomochi | B60R 21/231 |
| 9,539,979 B2 * | 1/2017 | Miyata | B60R 21/239 |
| 9,878,685 B2 * | 1/2018 | Jang | B60R 21/239 |
| 10,236,279 B2 | 7/2019 | Farooq et al. | |
| 10,407,018 B2 | 9/2019 | Sundararajin et al. | |

* cited by examiner

*Primary Examiner* — Faye M Fleming
(74) *Attorney, Agent, or Firm* — Frank A. MacKenzie; Bejin Bieneman PLC

(57) ABSTRACT

An assembly includes a dash and an airbag supported by the dash. The airbag is inflatable to an inflated position. The airbag in the inflated position has a first end and a second end spaced from each other in a cross-vehicle axis and an inflation chamber between the first end and the second end. The airbag includes a tube extending through the inflation chamber from the first end to the second end.

18 Claims, 7 Drawing Sheets

DASH MOUNTED AIRBAG

BACKGROUND

During a vehicle impact, occupants may move in a direction influenced by the momentum of the vehicle. In a frontal vehicle impact, an occupant may be biased toward a vehicle component, e.g., an instrument panel, in front of the occupant.

DETAILED DESCRIPTION

Figure 1:
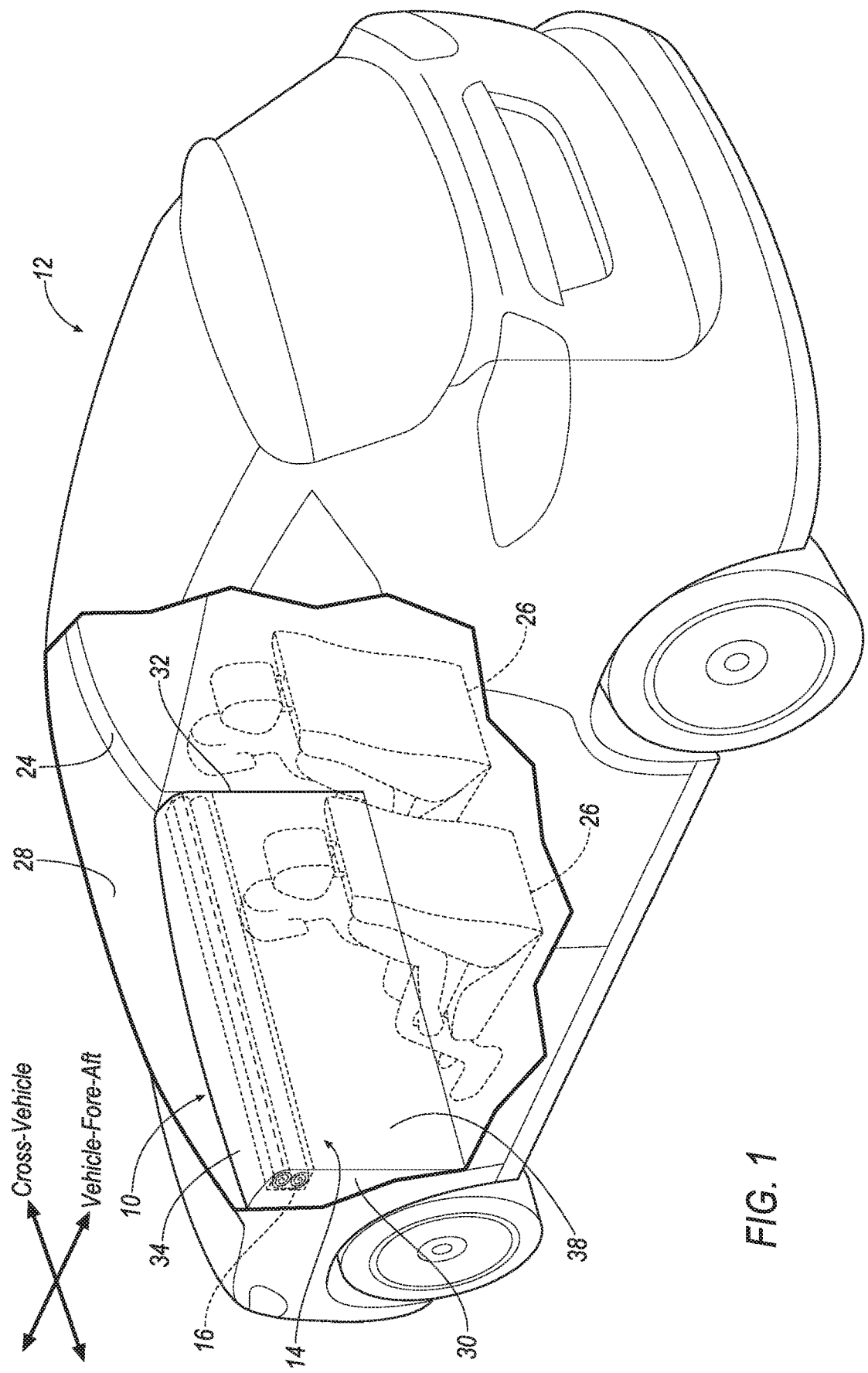
FIG. 1 is a cut-away view of a vehicle including an airbag assembly mounted to a dash.

An assembly includes a dash and an airbag supported by the dash and inflatable to an inflated position. The airbag in the inflated position has a first end and a second end spaced from each other in a cross-vehicle axis and an inflation chamber between the first end and the second end. The airbag includes a tube extending through the inflation chamber from the first end to the second end.

The tube is open at the first end and the second end.

The inflation chamber extends entirely around the tube.

The tube is designed to collapse when impacted by an occupant when the airbag is in the inflated position.

The tube includes a bore fluidly isolated from the inflation chamber.

The tube is open at the first end and the second end and includes a bore fluidly isolated from the inflation chamber, and the inflation chamber extends entirely around the tube.

The airbag includes panels defining the inflation chamber and the tube and the panels are fabric.

The dash has a top and the airbag includes an extension that abuts the top in the inflated position. The extension extends from the first end of the airbag to the second end of the airbag. The extension is elongated along the cross-vehicle axis.

The assembly may include a windshield. The dash has a top facing the windshield.

The airbag includes an extension wedged between the top and the windshield in the inflated position.

The dash has a vehicle-rearward face and the airbag may extend downwardly from the extension along the vehicle-rearward face. The tube is vehicle-rearward of the vehicle-rearward face.

The dash has a vehicle-rearward face and the tube may be vehicle-rearward of the vehicle-rearward face.

The airbag may be elongated along the cross-vehicle axis.

The dash may be elongated along the cross-vehicle axis from a first end of the dash to a second end of the dash. The airbag may be elongated along the cross-vehicle axis from the first end of the dash to the second end of the dash.

The airbag may include an adaptive vent between the inflation chamber and an exterior of the inflation chamber, the adaptive vent being designed to open after the tube collapses.

With reference to the Figures, wherein like numerals indicate like parts throughout the several views, an assembly 10 for a vehicle 12 is generally shown. The assembly 10 includes a dash 14, an airbag 16 supported by the dash 14 and inflatable to an inflated position. The airbag 16 in the inflated position has a first end 18 and a second end 20 spaced from each other in a cross-vehicle axis and an inflation chamber (not numbered) between the first end 18 and the second end 20. The airbag 16 includes a tube 22 extending through the inflation chamber between the first end 18 and the second end 20.

Figure 6:
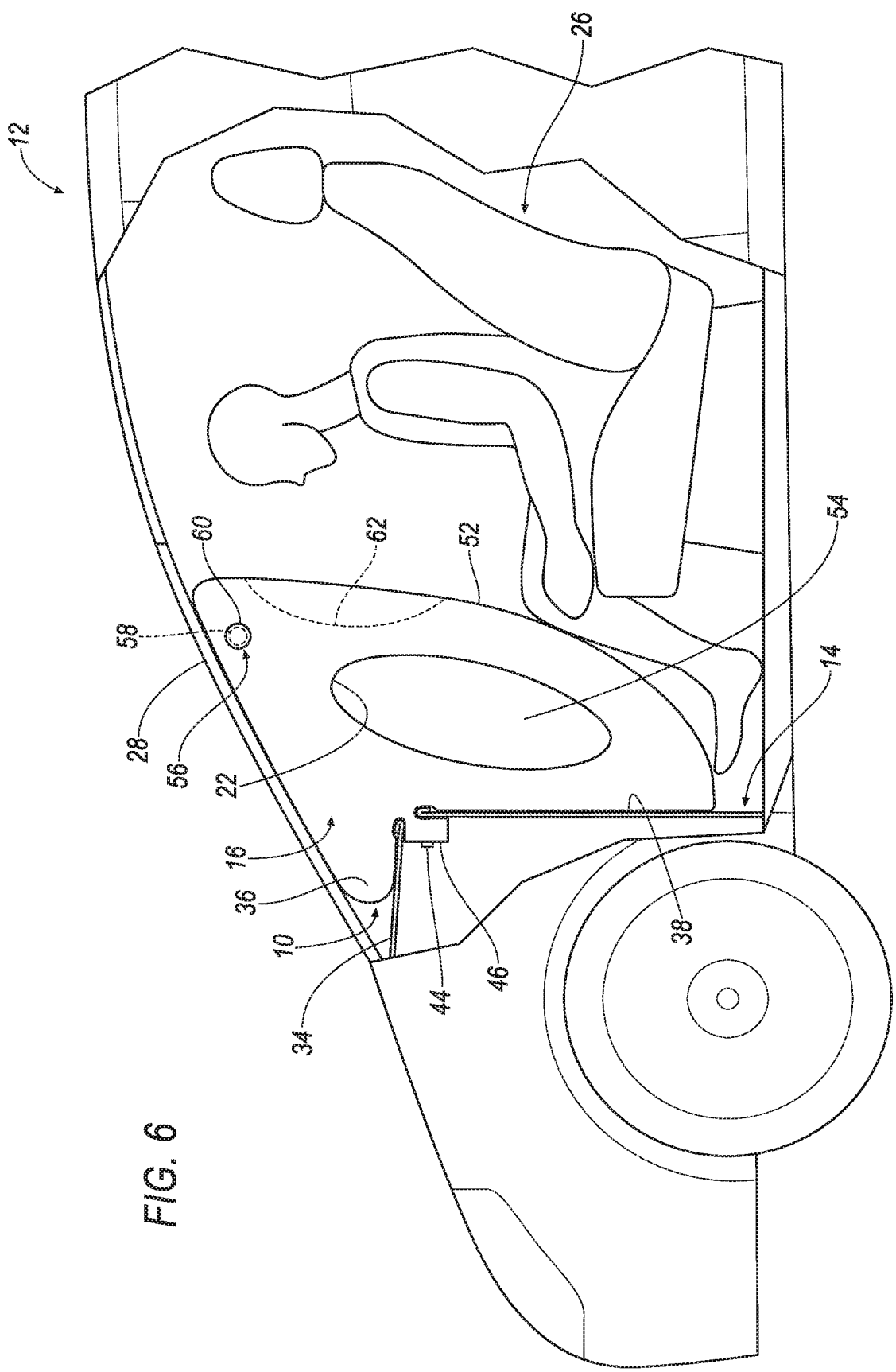
FIG. 6 is a side view of the vehicle with the airbag assembly inflated and an occupant moving toward the airbag assembly.
Figure 7:
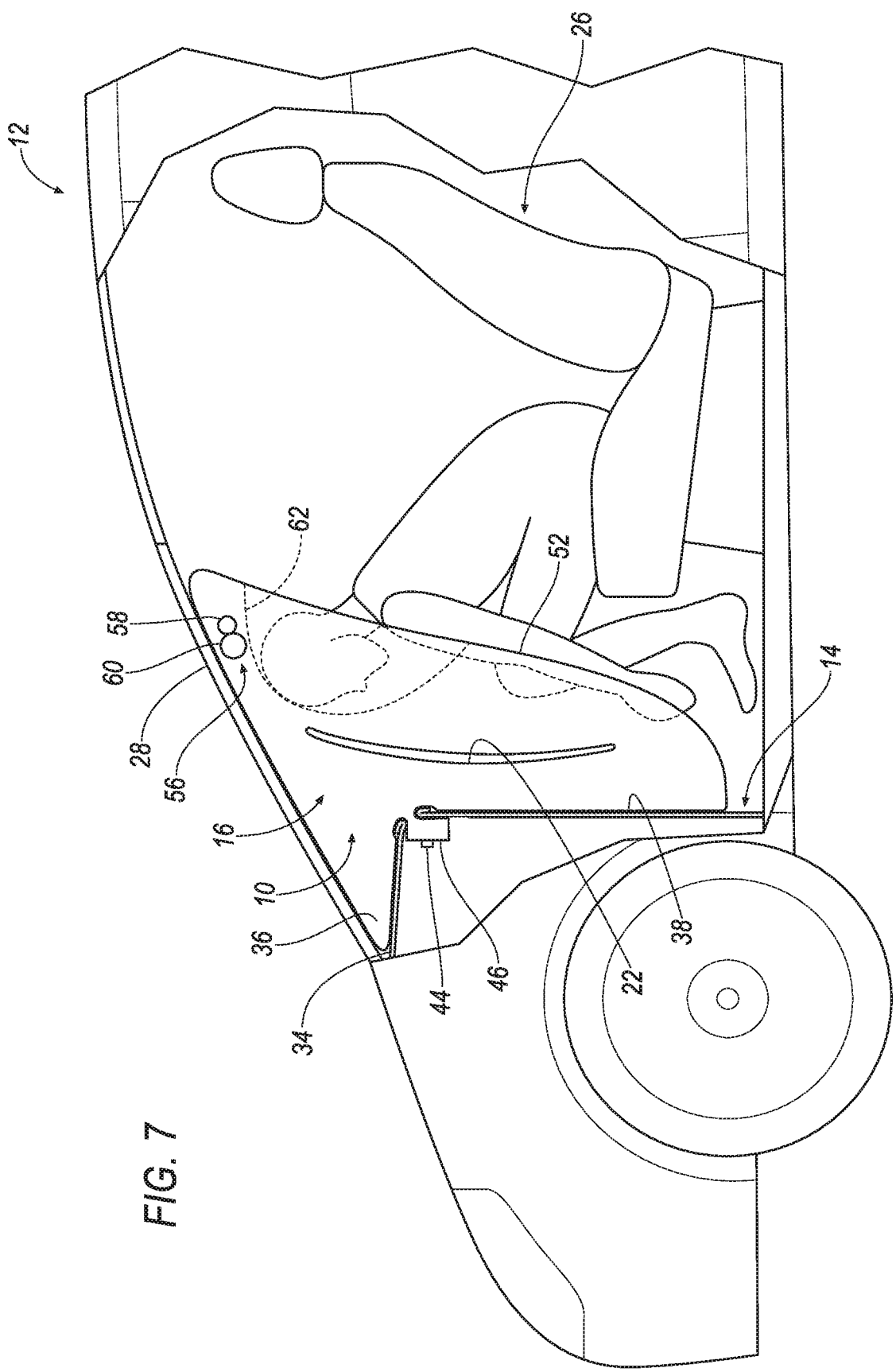
FIG. 7 is a side view of the vehicle with the airbag assembly in the inflated position and the occupant impacting the airbag assembly.

The tube 22 reduces the amount of inflation medium to inflate the airbag 16 and also controls the kinematics of the occupant during impact of the occupant against the airbag 16. In the event of a vehicle impact that urges the occupant in a direction toward the dash 14, the airbag 16 is inflated from an uninflated position (FIG. 1) to the inflated position (FIG. 2) and the occupant contacts the airbag 16 during movement toward the dash 14. The airbag 16 controls the kinematics of the occupant as the occupant impacts the airbag 16. As the occupant continues to move toward the airbag 16, the tube 22 collapses to control the kinematics of the occupant as the occupant continues to move into the airbag 16. The airbag 16 controls the kinematics of a belted occupant, i.e., belted to a seat 26 with a seatbelt, and controls the kinematics of an unbelted occupant, i.e., not belted to the seat 26 with a seatbelt as shown in FIGS. 6 and 7.

The vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The vehicle 12, for example, may be an autonomous vehicle. In other words, the vehicle 12 may be autonomously operated such that the vehicle 12 may be driven without constant attention from a driver, i.e., the vehicle 12 may be self-driving without human input.

The vehicle 12 may include two sides (not numbered) spaced from each other in the cross-vehicle direction. The sides of the vehicle 12 may be elongated in the vehicle fore-and-aft direction. Each side of the vehicle 12 may be similar or identical to each other.

Figure 2:
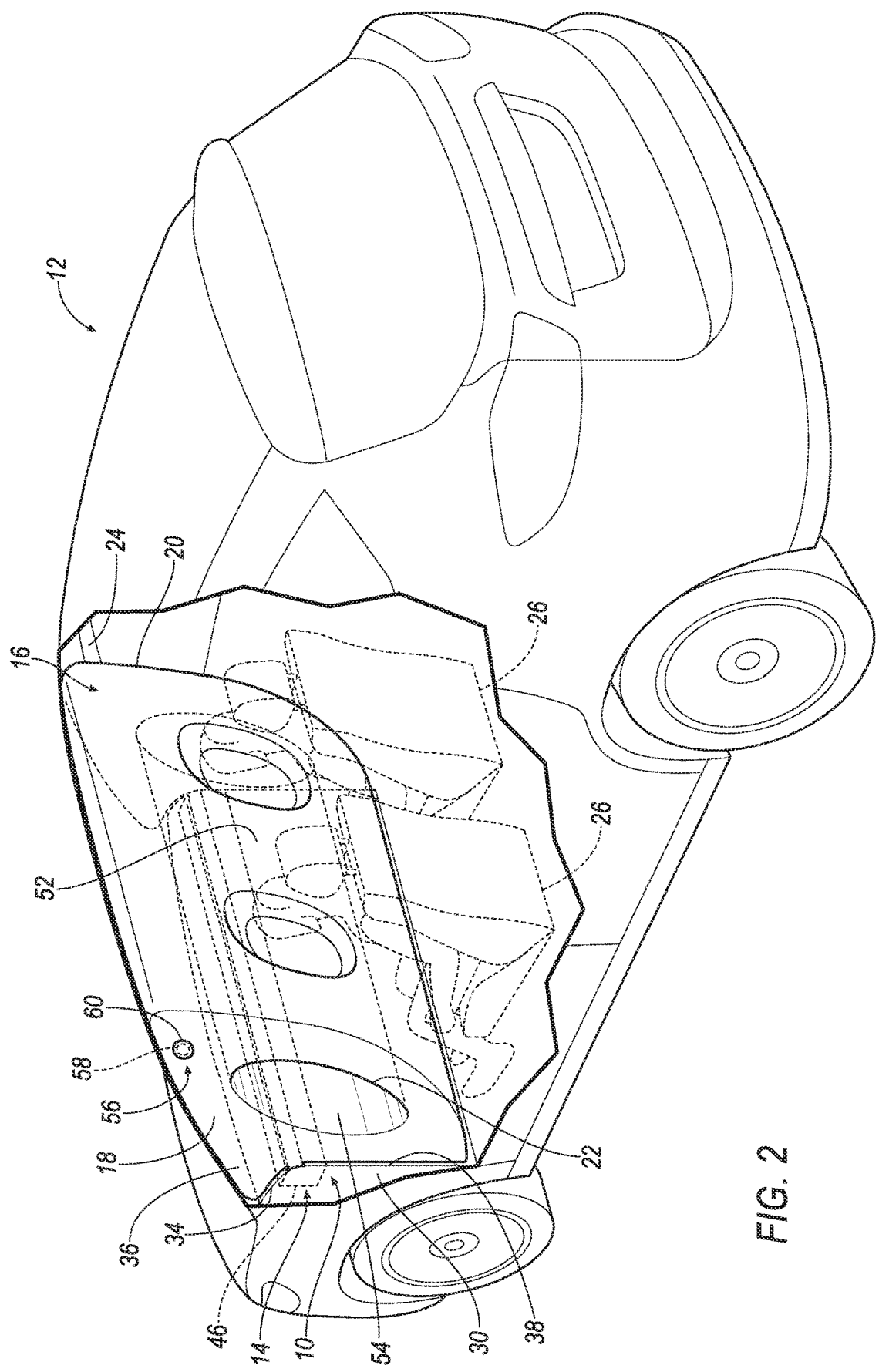
FIG. 2 is a cut-away view of the vehicle with the airbag assembly in an inflated position.

With reference to FIG. 1, the vehicle 12 may include a body defining a passenger cabin to house occupants, if any, of the vehicle 12. The passenger cabin may extend across the vehicle 12, i.e., from one side to the other side of the vehicle 12. The passenger cabin includes a front end (not numbered) and a rear end (not numbered) with the front end being in front of the rear end during forward movement of the vehicle 12.

The body may include a roof, a floor spaced from the roof, and pillars 24 extending downwardly from the roof, i.e., generally towards the floor. The roof and the floor may each extend across the passenger cabin, i.e., from one side to the other side of the vehicle 12. The roof may define an upper boundary of the passenger cabin and the floor may define a lower boundary of the passenger cabin.

The body may include any suitable number of pillars 24, e.g., a front pillar (also called an A-pillar), a middle pillar (also called a B-pillar), and a rear pillar (which may be called a C-pillar, D-pillar, etc.). The pillars 24 may be spaced from each other in the cross-vehicle direction, i.e., the front pillars are spaced from each other in the cross-vehicle direct, the rear pillars are spaced from each other in the cross-vehicle direction, etc. In other words, one front pillar may be disposed on one side of the vehicle 12, and the other front pillar may be disposed on the other side of the vehicle 12.

The vehicle 12 includes one or more seats 26 in the passenger cabin. The seats 26 may be arranged in any suitable arrangement. For example, one or more of the seats 26 may be at the front end of the passenger cabin, i.e., a front seat, and/or one or more of the seats 26 may be at the rear end of the passenger cabin, i.e., a rear seat. Specifically, the passenger cabin may include two front seats spaced from each other in the cross-vehicle direction.

Each seat 26 is supported by the floor. The position and orientation of the seats 26 and components thereof may be adjustable by an occupant. In this situation, each seat 26 may slide relative to the floor, e.g., in the vehicle fore-and-aft direction, along a seat track (not shown).

As another example, each seat 26 may be rotatable about a generally vertical axis. For example, the seat 26 may rotate to a position such that a seatback of the seat 26 is between the occupant and the dash 14. In such an example, the airbag 16 may abut the seatback in the inflated position to support the seatback. In addition, the airbag 16 may be between the head of the occupant an a windshield 28 of the vehicle 12.

The vehicle 12 includes at least one windshield 28. As an example, the vehicle 12 may include one windshield 28 at the front end of the passenger cabin and another windshield 28 at the rear end of the passenger cabin (which may also be called a backlite). The windshield 28 extends from one side of the vehicle 12 to the other side of the vehicle 12. For example, the windshield 28 may extend from one pillar 24 to another pillar 24. The windshield 28 may extend from the roof along the front pillars, i.e., towards the floor.

With continued reference to FIG. 1, the vehicle 12 includes at least one dash 14. In the example shown in the Figures, the vehicle 12 includes one dash 14 at the front end of the passenger cabin. In addition or in the alternative, the vehicle 12 may include another dash 14 at the rear end of the passenger cabin. In any event, the dash 14 is at the front end and/or the rear end of the passenger cabin, as described further below. The dash 14 may also be called a bulkhead.

The dash 14 may be a structural member of the frame of the vehicle 12, i.e., is a portion of the frame resists static and dynamic forces from operation of the vehicle 12 without undue deflection or distortion. Examples of forces include a weight of other vehicle components, passengers, and cargo; twisting forces caused by driving over uneven surfaces; torque from a transmission; longitudinal and lateral forces from driving; and possibly forces from impacts with other vehicles or impactors.

The dash 14 may include vehicle controls, such as gauges, dials, screens, and information displays; heating and ventilation equipment; a radio and other electronics; etc. The dash 14, as well as the rest of the vehicle 12, may lack a steering wheel and may lack pedals for accelerating and braking. In other words, no steering wheel or pedals for accelerating and braking are supported by or adjacent to the dash 14. More specifically, the vehicle 12 does not include a steering wheel or pedals for accelerating and braking, e.g., is an autonomous vehicle.

The dash 14 may extend from one side of the vehicle 12 to the other side of the vehicle 12, i.e., across the passenger cabin in the cross-vehicle direction. For example, the dash 14 may extend from one pillar 24 to another pillar 24. The dash 14 may extend downwardly from the windshield 28. For example, the dash 14 may extend from the windshield 28 to the floor.

The dash 14 may be in front of the seats 26, e.g., at the front end of the passenger cabin, as shown in FIG. 1. In such an example, the dash 14 faces the seats 26. The dash 14 may, for example, include a class-A surface, i.e., a surface specifically manufactured to have a high quality, finished aesthetic appearance free of blemishes.

The dash 14 includes a first end 30 and a second end 32 spaced from the first end 18. The dash 14 may be elongated cross-vehicle from the first end 30 of the dash 14 to the second end 32 of the dash 14. As an example, the dash 14 may extend from the first side of the vehicle 12 to the second side of the vehicle 12 in the cross-vehicle direction. Specifically, the dash 14 may extend from one pillar 24 to another pillar 24.

The dash 14 has a top 34 and a vehicle-rearward face 38. The top 34 may extend from the windshield 28 to the vehicle-rearward face 38 in a vehicle-rearward direction. The vehicle-rearward face 38 extends from the top 34 toward the floor. As discussed above, the airbag 16 may be inflatable from the dash 14. As one example, the airbag 16 may be inflatable from the dash 14 where the top 34 and the vehicle-rearward face 38 meet.

The top 34 may extend from the first end 18 to the second end 20 of the dash 14. In other words, the top 34 may extend from one pillar 34 to another pillar 34. The top 34 may be adjacent the windshield 28, i.e., with the lack of any other components between the top 34 and the windshield 28 when the airbag 16 is uninflated. Specifically, the top 34 faces the windshield 28. As described further below, the airbag 16 may include an extension 36 that abuts the top 34 when the airbag 16 is in the inflated position.

The vehicle-rearward face 38 may extend from the first end 30 to the second end 32. The airbag 16 in the inflated position is between the vehicle-rearward face 38 and the seat 26. Specifically, the airbag 16 extends downwardly from the top 34, i.e., from the extension 36, along the vehicle-rearward face 38.

The dash 14 may, for example, be flat in the cross-vehicle direction, as shown in FIG. 1. In other words, the dash 14 may be generally planar. Specifically, the vehicle-rearward face 38 may be flat.

Figure 5:
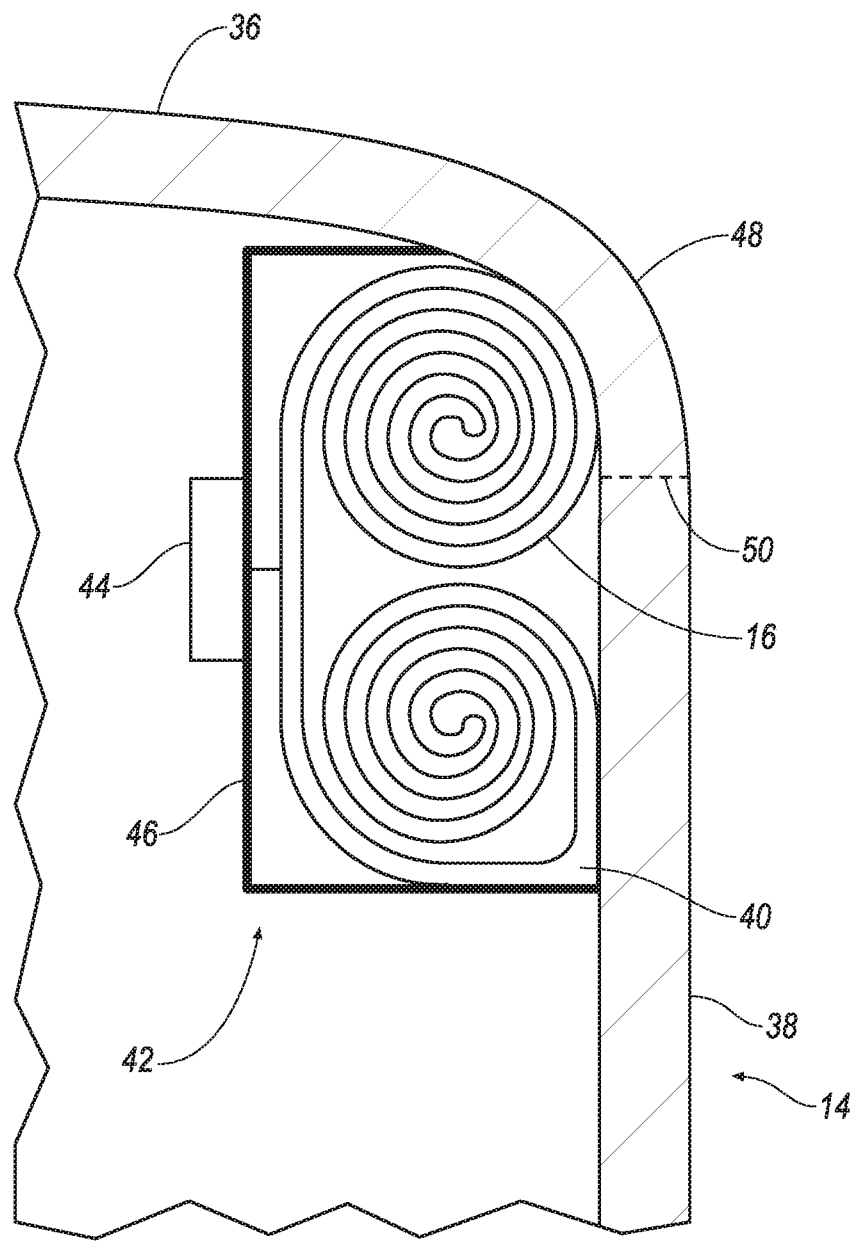
FIG. 5 is a magnified portion of FIG. 4.

With reference to FIG. 5, the dash 14 may include a recess 40 designed, i.e., sized and positioned, to receive and support the airbag 16, as set forth further below. The recess 40 may be disposed at any suitable position on the dash 14, e.g., between the floor and the windshield 28. The recess 40 may be elongated in the cross-vehicle direction. The recess 40 may extend any suitable amount in the cross-vehicle direction. In the example shown in the Figures, the recess 40 extends substantially entirely across the dash 14 in the cross-vehicle direction.

The dash 14 may include any suitable number of recesses 40. In the example shown in the Figures in which one airbag 16 is supported by the dash 14, the dash 14 includes one recess 40. In other examples in which multiple airbags 16 are supported by the dash 14, the dash 14 may include more than one recess 40, e.g., one recess 40 for each airbag 16.

The assembly 10 includes at least one airbag assembly 42, which includes the airbag 16 and an inflator 44. The airbag assembly 42 may include a housing 46, as described further below. The dash 14 supports the airbag assembly 42, and specifically, supports the airbag 16 when the airbag 16 is in the inflated position, as set forth further below. The assembly 10 may include any suitable number of airbag assemblies 42.

In the example shown in the Figures, the assembly 10 includes one airbag assembly 42 elongated across the dash 14 to interact with multiple occupants. As another example, the assembly 10 may include more than one airbag assembly 42, e.g., each dedicated to one occupant.

The airbag assembly 42 is fixed to the dash 14. Specifically, the airbag assembly 42 may be disposed in the recess 40. In such an example, the dash 14 may include a cover 48 extending over the airbag assembly 42. The cover may include a tear seam 50 for allowing the airbag 16 to break through the dash 14 when the airbag 16 is inflated to the inflated position.

With reference to FIG. 5, as set forth above, the airbag assembly 42 may include the housing 46. In such examples, the housing 46 is mounted to the dash 14, e.g., in the recess 40. The housing 46 supports the airbag 16 in the uninflated position and the inflated position. The airbag 16 may be folded in the housing 46 in the uninflated position. The housing 46 may be elongated in the cross-vehicle direction. The airbag 16 may be rolled in opposite directions in the housing 46 in the uninflated position, as shown in FIG. 5. Specifically, one portion of the airbag 16 may be rolled in a clockwise direction and another portion of the airbag 16 may be rolled in a counter-clockwise direction.

In the inflated position, the airbag 16 includes ends 18, 20 (i.e., a first end 18 and a second end 20) spaced from each other in the cross-vehicle direction. The airbag 16 terminates at the ends 18, 20. Each end 18, 20 of the airbag 16 may be spaced from the front pillars in the inflated position. The airbag 16 may be elongated in the cross-vehicle direction from the first end 18 to the second end 20, i.e., may be longer in the cross-vehicle direction than wide and tall in other directions. As an example, the airbag 16 may be elongated in the cross-vehicle direction across more than one seat 26. In such an example, more than one occupant may impact the airbag 16 during a vehicle impact.

The airbag 16 includes an impact panel 52 extending from one end 18 to the other end 20. The impact panel 52 in the inflated position faces the passenger cabin. The impact panel 52 is positioned to receive and be impacted by the occupant when the airbag 16 is inflated during an impact that urges the occupant toward the airbag 16.

The impact panel 52 may be designed, i.e., sized, shaped, etc., to receive the head and the knees of the occupant, as shown in FIG. 7. Specifically, the impact panel 52 may include a head-impacting region and a knee-impacting region. The knee-impacting portion may be disposed adjacent to knees of an occupant between 5th-percentile female and 95th-percentile male stature sitting in the seat. The $5^{th}$ percentile female and $95^{th}$ percentile male stature may be based on a standards-setting body, e.g., a government agency such as the National Highway Traffic Safety Administration (NHTSA). As one example, NHTSA has defined the $5^{th}$ percentile female stature to be 5 feet tall and 110 pounds, e.g., the Hybrid III $5^{th}$ percentile female. As another example, NHTSA has defined the $95^{th}$ percentile male stature to be 6 feet 2 inches tall and 223 pounds, e.g., the Hybrid III $95^{th}$ percentile male.

The airbag 16 defines an inflation chamber. During inflation, the inflation chamber is inflated from the uninflated position to the inflated position. The inflation chamber is bounded by, i.e., defined by, at least the impact panel 52 and the ends 18, 20, as shown in FIG. 3.

The airbag 16 includes a tube 22 extending through the inflation chamber from the first end 18 to the second end 20. The tube 22 may be elongated from the first end 18 to the second end 20, i.e., a length from the first end 18 to the second end 20 is greater than the diameter of the tube 22. In other words, the tube 22 may be longer in the cross-vehicle direction than wide in the vehicle-for-aft direction. The tube 22 may be of any suitable cross-sectional shape. The tube 22 is shown as having an oval cross-sectional shape in the Figures merely as one example.

The tube 22 is open at the first end 18 and the second end 20. Specifically, the tube 22 includes a bore 54 fluidly isolated from the inflation chamber and the bore 54 extends from the first end 18 to the second end 20. As shown in FIG. 6, the tube 22 is expanded in a vehicle-for-aft direction when inflated. As shown in FIG. 7, the tube 22 collapses in the vehicle-for-aft direction during impact of the occupant with the airbag 16, as described further below. Since the tube 22 is fluidly isolated from the inflation chamber, the tube 22 reduces the amount of inflation medium from the inflator 44 otherwise necessary to inflate the airbag 16 to the inflated position. In addition, the tube 22, in part, controls the kinematics of the occupant during impact of the occupant with the airbag 16.

Figure 3:
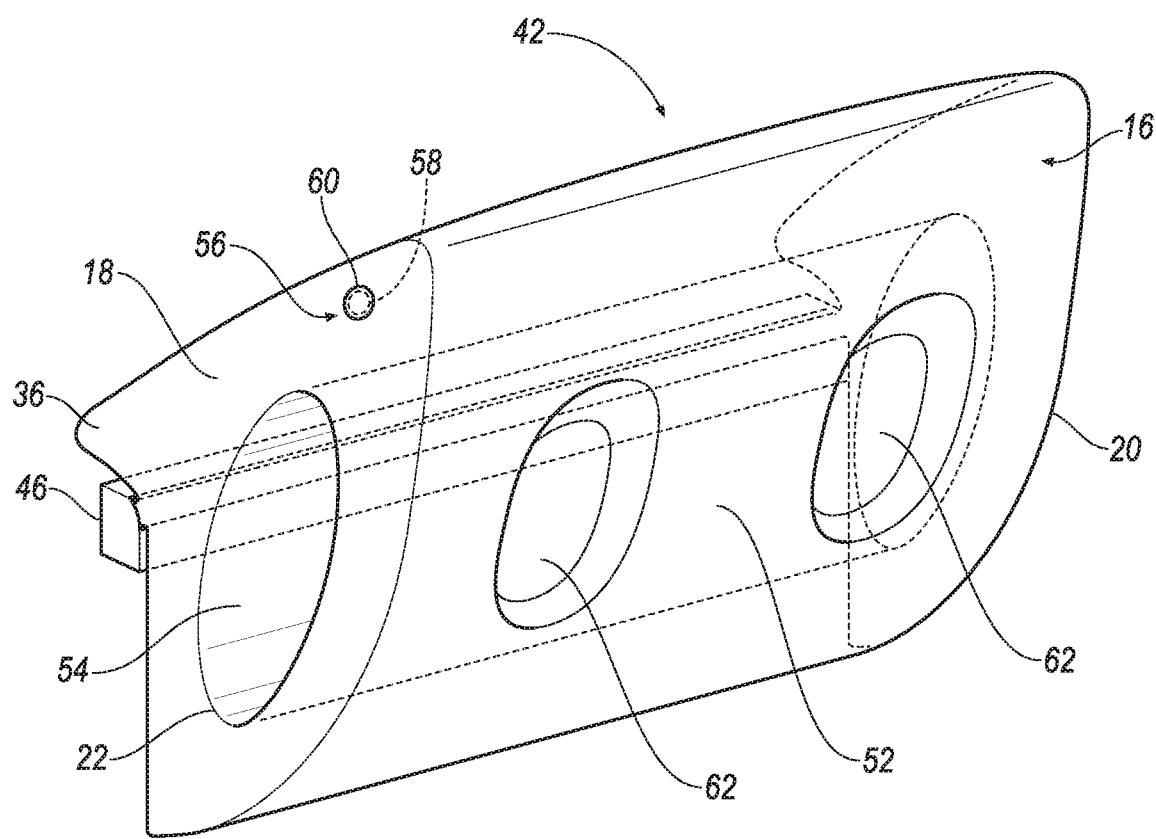
FIG. 3 is a perspective view of the airbag assembly in the inflated position.
Figure 4:
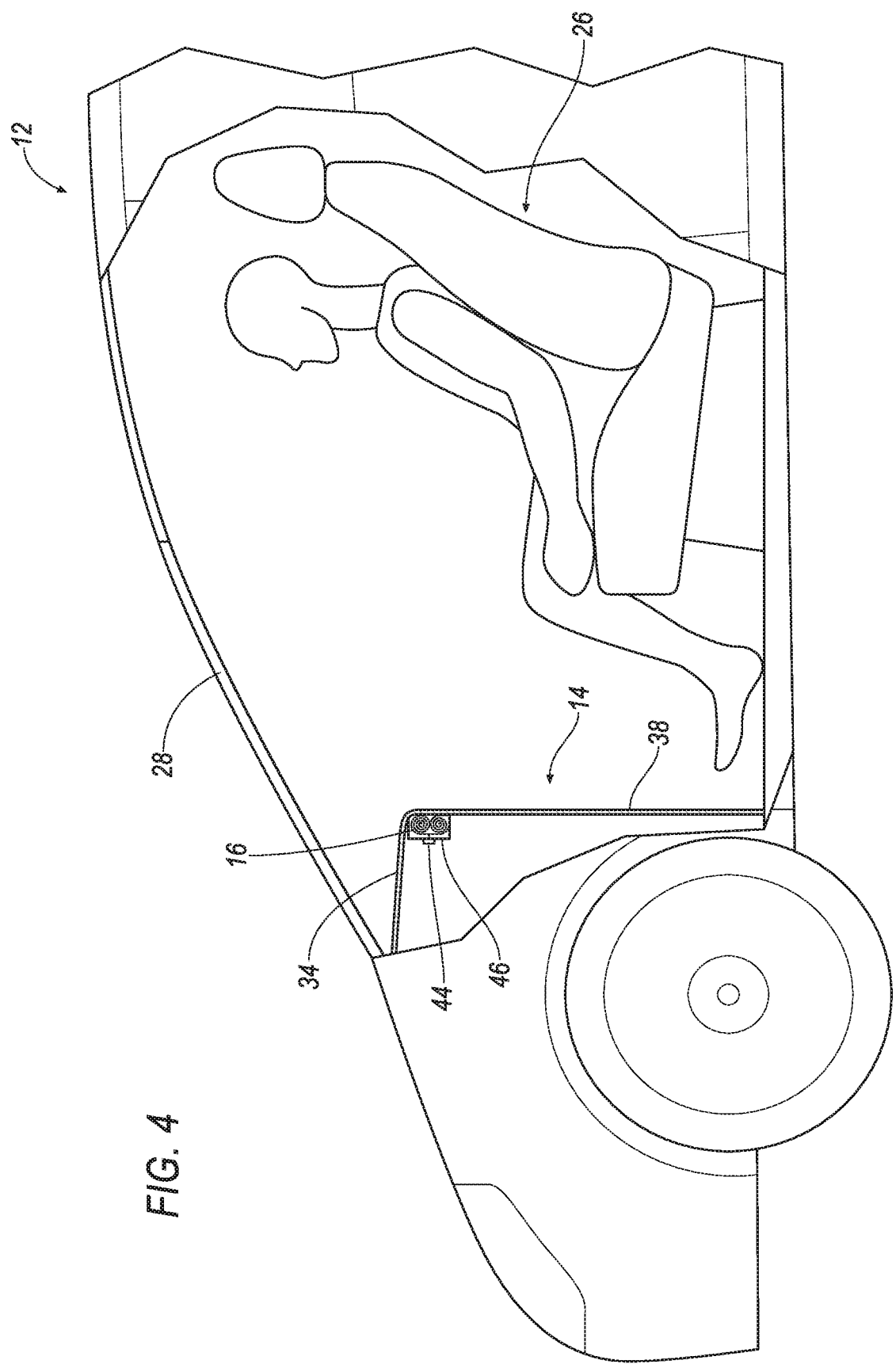
FIG. 4 is a side view of the vehicle with the airbag assembly uninflated.

The inflation chamber extends entirely around the tube 22, as shown in FIG. 3. In other words, the inflation chamber is uninterrupted around the tube 22 such that inflation medium from the inflator 44 may freely flow around the tube 22 during inflation of the airbag 16. The tube 22 is spaced from other panels of the airbag 16 except the first end 18 and the second end 20 through which the tube 22 extends. The tube 22 is vehicle-rearward of the vehicle-rearward face 38 of the dash 14 and the tube 22 is vehicle-forward of the impact panel 52. The inflation chamber is positioned between the tube 22 and the vehicle-rearward face 38 of the dash 14 and between the tube 22 and the impact panel 52.

The tube 22 is designed to collapse when impacted by an occupant when the airbag 16 is in the inflated position. In other words, the tube 22 has the size and/or shape and/or the location relative to the rest of the airbag 16 such that the tube 22 collapses, as shown in FIG. 7. As set forth above, the tube 22, in part, controls the kinematics of the occupant. Specifically, the kinematics of the occupant is initially controlled by the impact panel 52 inflated by the inflation chamber. The occupant moves the impact panel 52 vehicle-forward as the occupant continues to move toward the dash 14. As the occupant continues to move vehicle-forward, the force of the occupant collapses the tube 22 and the collapse of the tube 22 controls the kinematics of the occupant. When the tube 22 is collapsed, the airbag 16 continues to control the kinematics of the occupant. When collapsed, the bore 54 is smaller, as shown by comparison of FIGS. 6 and 7. When collapsed, portions of the tube 22 opposing each other in the vehicle-fore-and-aft direction may contact each other, as shown in FIG. 7.

As set forth above, the dash 14 has the top 34 and the airbag 16 may include an extension 36 that abuts the top 34 in the inflated position. The extension 36, in part, controls the position of the airbag 16, i.e., the impact panel 52. Specifically, the extension 36 is wedged between the top 34 of the dash 14 and the windshield 28 in the inflated position, as shown in FIGS. 6 and 7, so that the top 34 of the dash 14 and the windshield 28 act as a reaction surface for the airbag 16. The extension 36 may be elongated along the cross-vehicle axis. For example, the extension 36 may extend from the first end 18 of the airbag 16 to the second end 20 of the airbag 16.

As set forth above, the dash 14 has the vehicle-rearward face 38 and the airbag 16 extends downwardly along the vehicle-rearward face 38. Specifically, the airbag 16 abuts the vehicle-rearward face 38 of the dash 14 when the airbag 16 is in the inflated position. The vehicle-rearward face acts as a reaction surface for the airbag 16 when the occupant impacts the airbag 16 in the inflated position. As one example, the compression of the airbag 16 between the occupant and the vehicle-rearward face 38 of the dash 14 causes the tube 22 to collapse as described above.

The tube 22 may be fabric. In addition, the panels of the airbag 16 that define the inflation chamber (including the ends 18, 20 and the impact panel 52) may also be fabric. The panels of the airbag 16 that define the inflation chamber (including the ends 18, 20 and the impact panel 52) and the tube 22 may be of the same material type. For example, the airbag 16 may be of any suitable type of material, e.g., from a woven polymer. For example, the airbag 16 may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc.

The airbag 16 (i.e., the ends 18, 20, the impact panel 52, and the tube 22) may be a single continuous unit, e.g., a single piece of fabric. Alternatively, the airbag 16 may include a plurality of segments, i.e., two or more. The segments may be attached to each other in any suitable fashion, e.g., a plurality of panels attached by stitching, ultrasonic welding, etc.

The airbag 16 includes an adaptive vent 56 between the inflation chamber and an exterior of the inflation chamber. The adaptive vent 56 is closed when the airbag 16 is in the inflated position before an occupant impacts the airbag 16, i.e., the adaptive vent 56 prevents substantially all gas flow from the inflation chamber through the adaptive vent 56. The adaptive vent 56 is configured to open when pressure in the inflation chamber exceeds a predetermined value. The adaptive vent 56 allows gas to flow through the adaptive vent 56 from the inflation chamber to the exterior, i.e., to vent the inflation chamber, when the adaptive vent 56 is open. The adaptive vent 56 is passive, i.e., the pressure in the inflation chamber opens the adaptive vent 56.

The adaptive vent 56 may be of any type, including known designs. As one example shown in the Figures, the adaptive vent 56 may include a hole 58 in communication with the inflation chamber and a cover 60 stitched around the hole 58. When pressure in the inflation chamber is below the predetermined level, the cover 60 remains stitched around the hole 58 and prevents substantially all gas flow through the hole 58. When pressure in the inflation chamber exceeds the predetermined level, the pressure breaks the stitching to release the cover 60 and allow gas to flow from the inflation chamber through the hole 58.

The adaptive vent 56 may be designed to open after the tube 22 collapses. Specifically, the tube 22 may collapse in response to a force from the occupant impacting the impact panel 52 and the inflation chamber is at a first pressure resulting from the force from the occupant. In other words, the inflation chamber is at the first pressure when a force from the occupant is sufficient to collapse the tube 22. The adaptive vent 56 may open at a second pressure greater than the first pressure. Accordingly, when impacted by an occupant with force sufficient to collapse the tube 22, the tube 22 collapses and the inflation chamber is at the first pressure. As the occupant continues to move into the airbag 16, pressure in the inflation chamber continues to increase. When the pressure level in the inflation chamber reaches the second pressure, the pressure in the inflation chamber opens the adaptive vent 56 to vent pressure from the inflation chamber.

The airbag 16, specifically the impact panel 52, may include one or more head-receiving depressions 62. The head-receiving depressions 62 may be positioned to receive and be impacted by the head of the occupant, e.g., an occupant between 5th-percentile female and 95th-percentile male stature seated in the respective seat when the airbag 16 is inflated during an impact that urges the occupant towards the airbag 16. The head-receiving depressions 62 may be spaced from the sides of the airbag 16.

The head-receiving depression 62 may be round. In other words, the head-receiving depression 62 may be, e.g., circular, oval, elliptical, etc. The head-receiving depression 62 may have any suitable size, e.g., diameter. The head-receiving depression 62 may have any suitable depth. In other words, the head-receiving depression 62 may extend any suitable amount towards the dash 14. For example, the depth of the head-receiving depression 62 may be such that the sides of the airbag 16 may catch, i.e., slow or stop, the head of the occupant from sliding out of the head-receiving depression 62 during an oblique impact. Said differently, the sides, of the airbag 16 may retain the head of the occupant in the head-receiving depression 62.

As set forth above, the airbag assembly 42 includes the inflator 44. The inflator 44 is in fluid communication with the airbag 16 to inflates the airbag 16 from the uninflated position to the inflated position. The inflator 44 expands the airbag 16 with inflation medium, such as a gas, to move the airbag 16 from the uninflated position to the inflated position.

The inflator 44 may be, for example, a pyrotechnic inflator that uses a chemical reaction to drive the inflation medium into the airbag 16. Alternatively, the inflator 44 may be, for example, a cold-gas inflator that, when activated, ignites a pyrotechnic charge that creates an opening for releasing the pressurized inflation medium to the airbag 16 via a fill tube (not shown). Alternatively, the inflator 44 may be of any suitable type, for example, a hybrid inflator 44.

The vehicle 12 may include an inflation system (not shown) having a computer. The computer may be a microprocessor-based computing device implemented via circuits, chips, or other electronic components. For example, the computer may include a processor, memory, etc. The memory may store instructions executable by the processor and the processor may read the instructions from the memory and execute the instructions. The processor may be programmed to initiate an inflation of the airbag 16 in response to the vehicle impact.

The vehicle 12 may include impact detection sensors programmed to detect the vehicle impact to the vehicle 12. The impact detection sensors may be disposed in the vehicle 12. The impact detection sensors may be of various types, e.g., pressure sensor, acceleration sensor, vision sensor, etc. When the vehicle impact occurs, the processor may receive one or more signals from the impact detection sensors indicating the vehicle impact. In response to receiving the signals from the impact detection sensors, the processor may initiate the inflation of the airbag 16. Alternatively, the processor may initiate the inflation of the airbag 16 selectively based on information from the impact detection sensors identifying the physical characteristics of the vehicle impact, e.g., which side of the vehicle impacted, amount of pressure applied to the vehicle 12, etc. and also seat occupancy information, e.g., by using the occupancy sensors disposed inside the seats sensing the occupancy status of the seats.

In order to receive the signals from the sensors, e.g., the impact detection sensors, and to initiate the inflation of the airbag 16, the processor communicates with the sensors, e.g., the impact detection sensors, and the inflator 44, e.g., through a direct electrical wiring, through which an analog or a digital signal is transmitted, or through a communication network like CAN (Control Area Network), Ethernet, LIN (Local Interconnect Network) or any other way.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a dash having a top; and
   an airbag supported by the dash and inflatable to an inflated position;
   the airbag in the inflated position having a first end and a second end spaced from each other in a cross-vehicle axis and an inflation chamber between the first end and the second end;
   the airbag including a tube extending through the inflation chamber from the first end to the second end;
   the airbag includes panels defining the inflation chamber and the tube and the panels are fabric;
   the airbag including an extension that abuts the top in the inflated position; and
   the extension being elongated along the cross-vehicle axis.

2. The assembly of claim 1, wherein the tube is open at the first end and the second end.

3. The assembly of claim 1, wherein the inflation chamber extends entirely around the tube.

4. The assembly of claim 1, wherein the tube is designed to collapse when impacted by an occupant when the airbag is in the inflated position.

5. The assembly of claim 1, wherein the tube includes a bore fluidly isolated from the inflation chamber.

6. The assembly of claim 1, wherein the tube is open at the first end and the second end and includes a bore fluidly isolated from the inflation chamber, and the inflation chamber extends entirely around the tube.

7. The assembly of claim 1, wherein the extension extends from the first end of the airbag to the second end of the airbag.

8. The assembly of claim 1, further comprising a windshield, the dash having a top facing the windshield, the airbag including an extension wedged between the top and the windshield in the inflated position.

9. The assembly of claim 8, wherein the dash has a vehicle-rearward face and the airbag extends downwardly from the extension along the vehicle-rearward face.

10. The assembly of claim 9, wherein the tube is vehicle-rearward of the vehicle-rearward face.

11. The assembly of claim 1, wherein the dash has a vehicle-rearward face and the tube is vehicle-rearward of the vehicle-rearward face.

12. The assembly of claim 1, wherein the airbag is elongated along the cross-vehicle axis.

13. The assembly of claim 1, wherein the dash is elongated along the cross-vehicle axis from a first end of the dash to a second end of the dash, wherein the airbag is elongated along the cross-vehicle axis from the first end of the dash to the second end of the dash.

14. The assembly of claim 1, wherein the airbag includes an adaptive vent between the inflation chamber and an exterior of the inflation chamber, the adaptive vent being designed to open after the tube collapses.

15. An assembly comprising:
    a dash;
    an airbag supported by the dash and inflatable to an inflated position;
    the airbag in the inflated position having a first end and a second end spaced from each other in a cross-vehicle axis and an inflation chamber between the first end and the second end;
    the airbag including a tube extending through the inflation chamber from the first end to the second end; and
    the airbag being elongated along the cross-vehicle axis.

16. The assembly of claim 15, wherein the tube includes a bore fluidly isolated from the inflation chamber.

17. The assembly of claim 16, wherein the airbag includes panels defining the inflation chamber and the tube and the panels are fabric.

18. An assembly comprising:

a dash;

an airbag supported by the dash and inflatable to an inflated position;

the airbag in the inflated position having a first end and a second end spaced from each other in a cross-vehicle axis and an inflation chamber between the first end and the second end;

the airbag including a tube extending through the inflation chamber from the first end to the second end; and the tube including a bore fluidly isolated from the inflation chamber.

* * * * *